2,985,641
PROCESS FOR THE FORMATION OF UREA ADDUCTS BY GRINDING IN THE ABSENCE OF LIQUIDS

Kenneth W. Herrmann, Springfield Township, Hamilton County, Ohio, assignor to The Procter & Gamble Company, Cincinnati, Ohio, a corporation of Ohio No Drawing. Filed May 29, 1959, Ser. No. 816,989

7 Claims. (Cl. 260—96.5)

This invention relates to an adduct formation process. More particularly it relates to a process for forming urea and thiourea adducts in which the reacting components are in a solid, liquid-free state.

It is well known that urea and thiourea form adducts with a large number of organic compounds and that this adduct formation can be used to obtain a number of advantages, hereinafter described, in the processing of the organic compounds. The processes heretofore used to form urea and thiourea adducts with solid organic compounds (guest materials) involve the use of liquids in one form or another. The handling of such liquids results in a number of disadvantages in connection with the processes.

Adducts of solid guest materials have heretofore been formed in solid-liquid processes and liquid-liquid processes. These processes include reactions where: (1) the urea or thiourea is dissolved in a solvent, solid guest material is added and the adduct is precipitated; (2) the guest material is in solution, solid urea or thiourea is added and the adduct is precipitated; (3) the guest material and the urea or thiourea are in solution and the adduct is precipitated by evaporation of the solvent; (4) molten urea or thiourea is combined with a solid or molten guest material to form the adduct upon solidification; (5) solid urea or thiourea is added to a molten guest material to form an adduct upon solidification.

Each of these processes of the prior art involves a solvent or a liquid reactant. Forming adducts of normally liquid guest materials by simple mixing with urea or thiourea has wide application. However, the formation of adducts with normally solid guest materials has heretofore required the use of solvents or the melting of one or both of the reactants. Solvents are difficult to handle, and are often toxic or inflammable. Adduct formation with solvents generally involves complicated dissolution, crystallization, filtration, drying and recovery steps and equipment. Those adduct processes which require molten reactants involve difficulties in handling the reactants, heating steps and equipment and the danger of decomposition of the reactants. Thus, a distinct need has existed for a method for forming adducts with solid organic substances without the use of a liquid phase.

It is the object of this invention to provide a process for forming adducts of solid urea or thiourea and a solid, adduct-forming organic compound under liquid-free conditions.

It is another object of this invention to provide an adduct formation process using solid reactants which will overcome disadvantages of adduct formation processes requiring solvents or liquid reactants.

It is a further object of this invention to provide an adduct formation process which is simple and economical requiring a minimum of equipment.

It was found that by intimately contacting and uniformly mixing solid urea or thiourea as an adduct forming agent with a solid, adduct-forming, organic compound under liquid free conditions, a useful amount of adduct is formed.

The intimate contacting of the solid urea or thiourea with the solid, adduct-forming, organic compound is preferably accomplished as more fully hereinafter described, by mechanically working the solid urea or thiourea with the solid, adduct-forming, organic compound at a temperature lower than the melting point of any of the substances being worked and under liquid-free conditions. In addition, the intimate contacting of the reactants can be accomplished by uniformly mixing dry particles of these substances and allowing the substances to react, the reaction rate increasing with decreasing particle size.

It was quite surprising to find that useful amounts of adducts were formed in the solid state reactions described herein since solid state chemical reactions in general proceed extremely slowly or not at all.

Adduct formation by the solid state reaction described herein has a number of advantages over adduct formation reactions which require liquids in the form of solvents or molten reactants. Solid state adduct formation permits the formation of adducts with materials which cannot be heated or readily dissolved in common solvents such as water or methanol. Some materials such as peroxy fatty acids and unsaturated fatty materials decompose or oxidize when heated; and other materials, such as long chain fatty acids and their higher alcohol esters are insoluble in water and usually only slightly soluble in methanol. These difficulties are not encountered in the solid state reaction of the present invention.

Another advantage of adduct formation by the solid state reaction described herein as compared to other adduct formation methods is its simplicity. Mechanical working devices or containers are all that are required in the process of this invention as opposed to complicated liquid handling apparatuses required by the other methods.

Urea and thiourea adducts are members of the channel type of inclusion complexes in which the guest material is contained and held at least in part in a framework of the urea or thiourea. The number of organic compounds or guest materials which form adducts with urea and thiourea is very large and any of the solid organic materials which form adducts by the conventional solvent methods hereinbefore described will form similar adducts by the solid-state reactions of the process of this invention. The type of organic compound which will form an adduct with urea or thiourea depends on its molecular size. The compound must have a molecular size such that it will fit into the channel of urea or thiourea.

Urea has a channel reported to be about 5 A. x 6 A.; any compound with a molecular size too large to fit in this channel will not form an adduct with urea. For example, benzene would require a channel diameter of 5.9 A. and, therefore, does not form an adduct. Straight chain hydrocarbons for example have a cross section width of about 4.1 A. and form adducts readily. In general, ease of formation and stability of urea adducts increase with increasing chain length.

Solid, normal hydrocarbons, acids, esters, alcohols, aldehydes, amines, amides, sulfides, mercaptans, ethers and ketones are examples of compounds which form urea adducts. Chain lengths of about 8 carbon atoms in n-aliphatic compounds are about the shortest which will form reasonably stable urea adducts. Urea will form adducts with organic compounds having chain lengths up to about 50 carbon atoms. Some branched chain compounds and compounds containing cyclic structures will form urea adducts provided that there is a sufficiently long straight chain in the molecule, or the branched or ring portion of the molecule is not too large. Included in the term "adduct" as used in connection with this invention are adducts in which a guest compound has a molecular portion of sufficient size and length to be included in the urea or thiourea channel even though a larger molecular portion of the molecule prevents the inclusion of the entire compound in the channel.

Thiourea adducts and their formation are similar to urea adducts and their formation; however, the diameter of the thiourea channel is reported to be about 8 Å. Branched chained and cyclo aliphatic compounds fit into this larger channel, but apparently some of the narrower compounds fit so loosely in this channel that stable adducts are not readily formed. Thiourea adducts generally are less stable than urea adducts. Straight chain hydrocarbons, for example, do not form very stable adducts with thiourea. Many of the compounds which are capable of forming adducts with thiourea are liquids or gases. Therefore, the process of this invention finds greater applicability with urea adducts.

The scope and structural limitations of adduct formation have been extensively studied and published. The article by Daniel Swern, "Urea and Thiourea Complexes in Separate Organic Compounds," 47 Industrial and Engineering Chemistry 216 (1955) and the numerous references cited therein are examples of such publications. An exhaustive listing of all organic compounds capable and not capable of forming adducts with urea or thiourea is not necessary to describe the processes of the present invention. Numerous examples of organic compounds forming adducts with urea and thiourea respectively are found in U.S. Patent 2,520,715, issued to Fetterly on August 29, 1950.

Organic compounds forming adducts with urea have substantially normal structure or have a predominating substituent of substantially normal structure. Organic compounds forming adducts with thiourea have a predominating member which is a substantially branched radical or are predominantly cycloaliphatic.

Adducts are formed in the process of this invention by intimately contacting and substantially uniformly mixing the solid urea or thiourea with the adduct-forming solid organic compound (guest material) under liquid free conditions. The preferred method of accomplishing intimate contact of the urea or thiourea with the guest material in the solid-state, liquid free adduct formation is the mechanical working of the reactants. Mechanical working comprises the simultaneous mixing of the particles of the reactants, decreasing the particle size by comminution and pressure contacting of the particles. Mechanical working is intimate contacting of the reactant particles in a dynamic state as compared with the intimate contacting of the particles in a static state as hereinafter described.

When a mixture of urea or thiourea and the guest material is mechanically worked, some adduct is formed immediately. The amount of adduct formed increases with increased mechanical working. The amount of mechanical working necessary to form substantial amounts of adduct varies with the susceptibility of the guest material to adduct formation and the intensity of the mechanical working. The chief limits on the amount and intensity of mechanical working to be used are: the solid-state reaction should be maintained, i.e. melting of the reactants is preferably avoided; the subdivisions of the reactants should not be carried on to the extreme where destruction of the crystalline structure of the reactants might occur; economic considerations preclude mechanical working of the reactants beyond the point where the maximum amount of adduct is formed.

Mechanical working as defined above can be accomplished by a number of well known conventional means such as ball mills, roller mills, hammer mills, mortar and pestle, pulverizes, grinders, amalgamators, blenders, rod mills, tube mills, stamps, crushers, impact grinders and the like.

The means used to accomplish the mechanical working as herein described is a matter of choice and the optimum means for mechanical working varies with the physical nature and type of the solid organic substance to be formed into an adduct.

Another method for accomplishing intimate contact is to form a substantially uniform mixture, in powdered or particulate form, of the solid urea or thiourea and the solid organic compound capable of forming an adduct therewith. A small amount of adduct is formed on initial contact of the particles and more is formed as a function of time as the mixed substances are allowed to react in the static state. The initial mixing of the reacting substances can be accomplished by any suitable mixing means, the only requirement being substantially uniform mixing. The percent of adduct formation in a given time is increased as the particle size of the reactants is decreased. Adduct formation occurs if particles of urea or thiourea are intimately contacted in any proportion with particles of the solid organic guest material to be reacted.

A particle size smaller than about 60 mesh (Tyler screen system) is preferred when adducts are formed in a solid-state by intimate admixture in a static state. A particle size smaller than about 140 mesh is especially desirable. The temperature of the static, solid-state adduct formation is not critical but is carried out below the melting point of any of the reactants. Urea melts at 132.7° C.; thiourea melts at 180° C. As a practical matter, adduct formation at above about 0° C. is preferred. The rate of the reaction at a given particle size varies with the guest material forming the adduct with the urea or thiourea.

When urea is used as the adduct-forming agent, optimum rate and amount of adduct formation is obtained in a ratio of urea to guest material in the range by weight of about 1:1 to about 8:1. Pure urea adducts usually comprise urea and guest material in a weight ratio of urea to guest of about 3:1; mole ratios vary, but this weight ratio is about the same for urea adducts of most organic compounds. Complete adduct formation is obtained when substantially all of the guest material is in the form of an adduct and substantially no unadducted guest material is present. Many of the advantages of urea adduct formation as hereinafter described can be obtained without complete adduct formation and the weight ratios of the reactants can be less than 3:1, e.g. 1:1. In such a case there will usually be unadducted guest material and possibly some unadducted urea present. The tendency for complete adducting of the guest material is increased when urea in excess of the 3:1 ratio is used, e.g. ratios up to about 8:1. Excess urea is usually not objectionable since it is a generally innocuous substance.

The optimum weight ratio of thiourea to guest material varies since thiourea has a fairly unpredictable binding effect on the various branched chain and cyclic guest materials. The optimum weight ratio for thiourea and any particular guest material for a solid-state reaction can be determined by preparing an adduct of the same reactants by precipitating it from solution in the conventional manner and determining the ratio of the reactants in the resulting pure adduct by quantitative analysis. Thiourea in excess of this predetermined ratio can be advantageous to increase the rate and amount of adduct formed in a solid-state reaction.

Preferably the urea or thiourea and the guest material are mechanically worked or are allowed to react in the static state until at least about 20% adduct is formed. Here, and in the examples, reference to the percent adduct formed means that fraction of a theoretically complete adduct formation of a given guest material and urea or thiourea.

In the following examples, which are by way of illustration only, the amount of adduct formed in a given mixture of urea or thiourea and guest material was determined by the analytical method described below and which is outlined in "X-ray Diffraction Procedures," Klug and Alexander (1954) p. 410 and in an article by Mabis and Quimby in 25 Anal. Chem. 1814 (1953).

The mixtures were subjected to X-ray analysis using a Geiger counter powder diffractometer which measures and records the relative intensities of the X-ray diffraction lines. The amount of the adduct component was determined directly. The weight percent of adduct in a mixture was determined by comparing the intensity of adduct diffraction maxima for that mixture with the intensity of the same peaks in a sample of an adduct known to be pure. (The average of six diffraction maxima was used for the comparison.) A pure adduct for comparison purposes was formed by purification of an adduct formed by the solvent method, which consisted of heating the reactants at about 60° C. in a solution comprising 95% methanol and 5% water, precipitating the adduct by volatilizing a major portion of the solvent, cooling and filtering the remainder. A sample is pure adduct when it contains no unadducted urea, thiourea or guest material.

*Example I.*—To determine the effect of mechanical working on granular mixtures of urea and stearic acid having weight ratios of about 3:1 (the ratio in a pure adduct), various methods of mechanical working at room temperature, or about 22° C., were used to intimately contact the components of the mixtures. In all cases the percent adduct formed was determined by the X-ray diffraction pattern method described above.

(A) The mixture of urea and stearic acid was vigorously ground with a pestle in a porcelain mortar for about 5 minutes, 2 times a day for 7 days at room temperature and room conditions. After the first 3 days of this treatment, about 32% adduct had formed and after the full 7 days, about 76% adduct had formed.

(B) The mixture of urea and stearic acid was ground in a ball mill at room temperature. After 6 hours of milling, 23% adduct had been formed and after 22 hours of milling, 88% adduct had formed.

(C) The mixture of urea and stearic acid was mechanically worked at room temperature in an amalgamator (described in U.S. Patent 2,286,600) in which a metal ball in a metal capsule was violently and rapidly shaken back and forth with the mixture. After 3 minutes of this treatment, about 45% adduct had been formed.

(D) The mixture of urea and stearic acid was passed through a three roll mill at room temperature. 2% adduct was formed after three passes, 11% after six passes and 12% after nine passes through the mill.

The adducts of urea and stearic acid were crystalline solid particles, which were freer flowing, more easily handled and easier to disperse in water than unadducted stearic acid which tends to be waxy.

*Example II.*—Urea adducts of several compounds were formed by the solvent method of adduct formation described below and also by mechanically working the reactants in a solid state. In each case, the weight ratio of urea to guest material was about 3:1. The percent of the product as adduct was determined by the X-ray diffraction method described above.

The solvent method consisted of heating the reactants at about 60° C. in a solution comprising 95% methanol and 5% water for sufficient time and with sufficient solvent to dissolve the reactants, precipitating the adduct by volatilizing a major portion of the solvent, then cooling and filtering the precipitated adduct.

The solid state adducts were formed by grinding the dry reactants in a mortar with a pestle ten times for 5 minutes each time over a period of about 5 days at room temperature (about 22° C.). The mixture was then passed twice through a hammermill.

The following results were obtained:

| Compound | Percent Product As Adduct | |
|---|---|---|
| | Solid State Method | Solvent Method |
| A. Stearic Acid | 80 | 90 |
| B. Monostearin | 34 | 48 |
| C. Sodium salt of sulfated tallow fatty alcohol | 35 | 26 |
| D. Monoethanolamide of coconut oil fatty acids | 26 | 30 |
| E. The sulfated and sodium hydroxide neutralized reaction product of about 3 moles of ethylene oxide with one mole of the distilled coconut oil fatty alcohol containing predominantly dodecanol | 19 | 26 |

It is apparent that adduct formation by mechanical working in the solid-state is approximately as efficient in yield as the common solvent method and of greater simplicity.

The adducts formed in Example II are more crystalline, freer flowing, easier-to-handle solids than the unadducted compounds even when they were not separated from the unadducted components.

Urea adducts of the monoethanolamide of coconut oil fatty acids are more easily mixed with granular synthetic detergents than the unadducted compound. (Such a monoethanolamide is a desirable additive for granular synthetic detergents. See U.S. Patent 2,383,737 and German patent application 1,040,730.)

The rate of solution of the urea adduct of sodium tallow alkyl sulfate was observed to be about 10 times faster than the rate of solution of the unadducted compound in 100 mls. of agitated distilled water at 120° F.

*Example III.*—A determination was made by the solvent adduct formation method and X-ray diffraction analysis that 1,4-dicyclohexyl benzene formed an adduct with thiourea.

17.5 grams of thiourea and 5 grams of 1,4-dicyclohexyl benzene were mechanically worked at about 22° C. in the amalgamator described in Example IC. After about 15 minutes of this treatment, X-ray diffraction analysis (the method described above) showed that about 100% adduct was formed.

The adduct formation of thiourea and 1,4-dicyclohexyl benzene is useful, for example, in the isolation or separation of the adducted compound from long chain hydrocarbons which do not form adducts with thiourea.

*Example IV.*—Five mixtures were prepared containing 74% urea and 26% stearic acid by weight, with each mixture being in a different particle size range. This weight proportion corresponds to the mole ratio of 14.1/1 (urea/stearic acid) found in the pure adduct. The mixtures were placed in beakers and mixed thoroughly with a spatula avoiding excessive grinding of the particles against the walls of the beaker or each other and allowed to react at 21° C. for times up to about 400 hours. Periodically samples were removed to determine how much adduct had formed. The amount of adduct present in the samples was determined with the X-ray diffractometer analytical technique described above. The percents adduct formed at different times for the different mixtures are shown in the table below. Each reacting mixture was stirred again when a sample for X-ray diffraction analysis was removed.

| Particle size | Time in Hours | Percent Adduct |
|---|---|---|
| Through 30 mesh and on 40 mesh | 66 | 2 |
| | 137 | 2 |
| | 232 | 4 |
| | 328 | 6 |
| Through 60 mesh and on 80 mesh | 89 | 6 |
| | 161 | 15 |
| | 282 | 18 |
| | 404 | 26 |
| Through 140 mesh and on 180 mesh | 69 | 14 |
| | 190 | 30 |
| | 307 | 45 |
| | 331 | 51 |
| Through 180 mesh and on 200 mesh | 41 | 16 |
| | 162 | 27 |
| | 232 | 54 |

The table clearly indicates that adducts can be formed by uniform mixing of reactants in a solid, liquid-free state and allowing them to react. It also illustrates the increasing rate of adduct formation with decreasing particle size. The advantages described in Example I for urea adducts of stearic adduct were also obtained in Example IV.

If lauric acid or peroxylauric acid is substituted for the stearic acid in Example IV, a similar adduct formation reaction takes place with similar results.

Urea and thiourea adducts in general find application in processes for the separation and fractionation of different organic substances because of the varying susceptibility of such substances to adduct formation. This application is described in the article by Swern cited above.

Adducts are useful for other purposes. For example, adducts of difficultly soluble and dispersable solid materials can usually be used to disperse such materials in water more easily. When an adduct of such a material is diluted with water, the adduct decomposes and the guest material is dispersed in a fine form. The rate of solution of soluble solid organic materials from adduct form is greater than the rate for the uncomplexed material. The vapor pressure of a guest material in adduct form is reduced, thus tending to protect a solid material which sublimes, for example.

Adducts formed by the solid state reaction of this invention are free flowing solids which remain free flowing and are easily handled and which can be pressed into pellets readily. Thus, adduct formation is useful in cases where solid unadducted materials tend to cake when handled or are so powdery that pellets are desirable.

Even incomplete adduct formation in the solid state reaction of this invention results in the obtaining, to a useful degree, of the above described advantages in a simple, economic process. The presence of urea or thiourea in adducts generally results in no disadvantage since these substances are highly soluble, non-toxic and generally innocuos.

What is claimed is:

1. A process for preparing an adduct of an adduct forming agent selected from the group consisting of urea and thiourea, and a solid organic compound capable of forming an adduct therewith comprising the step of intimately contacting and uniformly mixing said agent and said compound in a solid, liquid-free state, at a temperature below the melting points of said agent and said compound.

2. The process of claim 1 in which said agent is urea and the ratio of said agent to said compound is in the range of about 1:1 to about 8:1.

3. A process for preparing an adduct of an adduct forming agent selected from the group consisting of urea and thiourea, and a solid organic compound capable of forming an adduct therewith, comprising the steps of intimately contacting and uniformly mixing said agent and said compound in a solid, liquid-free state at a temperature below the melting points of said agent and said compound, and mechanically working the resulting mixture, said mechanical working step comprising simultaneous mixing, comminution and pressure contacting of said agent and said compound.

4. The process of claim 3 in which said agent is urea and the ratio of said agent to said compound is in the range of about 1:1 to about 8:1.

5. A process for preparing an adduct of an adduct forming agent selected from the group consisting of urea and thiourea and a solid organic compound capable of forming an adduct therewith, comprising the steps of intimately contacting and uniformly mixing said agent and said compound in a solid, liquid-free state at a temperature below the melting points of said agent and said compound, and allowing said agent and said compound to react in the static state, the particle size of the reactants being smaller than about 60 mesh.

6. The process of claim 5 in which said agent is urea and the ratio of said agent to said compound is in the range of about 1:1 to about 8:1.

7. The process of claim 6 in which the said particle size is smaller than about 140 mesh.

References Cited in the file of this patent

Newey et al.: Ind. and Eng. Chem.; volume 42, No. 12; pages 2538–2541; December 1950.

Swern: Ind. and Eng. Chem.; volume 47; No. 2; pages 216–221, February 1955.